(12) United States Patent
Boketoft et al.

(10) Patent No.: US 9,386,280 B2
(45) Date of Patent: Jul. 5, 2016

(54) METHOD FOR SETTING UP A MONITORING CAMERA

(71) Applicant: Axis AB, Lund (SE)

(72) Inventors: Carl-Ola Boketoft, Sodra Sandby (SE); Niklas Hansson, Horby (SE)

(73) Assignee: AXIS AB, Lund (SE)

( * ) Notice: Subject to any disclaimer, the term of this patent is extended or adjusted under 35 U.S.C. 154(b) by 492 days.

(21) Appl. No.: 13/712,456

(22) Filed: Dec. 12, 2012

(65) Prior Publication Data

US 2013/0155230 A1   Jun. 20, 2013

Related U.S. Application Data

(60) Provisional application No. 61/578,022, filed on Dec. 20, 2011.

(30) Foreign Application Priority Data

Dec. 19, 2011   (EP) .................................... 11194275

(51) Int. Cl.
*H04N 7/18*     (2006.01)
*G03B 5/00*    (2006.01)
*G03B 17/12*   (2006.01)
*H04N 5/232*   (2006.01)

(52) U.S. Cl.
CPC .. *H04N 7/18* (2013.01); *G03B 5/00* (2013.01); *G03B 17/12* (2013.01); *H04N 5/232* (2013.01)

(58) Field of Classification Search
CPC ......... H04N 7/181; H04N 7/183; H04N 7/18; H04N 7/188; G08B 13/19656

USPC ......................................................... 348/143
See application file for complete search history.

(56) References Cited

U.S. PATENT DOCUMENTS

| | | | |
|---|---|---|---|
| 2006/0067672 A1 | 3/2006 | Washisu et al. | |
| 2009/0066988 A1* | 3/2009 | Imaizumi | ................. H04N 7/18 |
| 2010/0219944 A1* | 9/2010 | Mc Cormick et al. | ........ 340/436 |

FOREIGN PATENT DOCUMENTS

| | | | |
|---|---|---|---|
| JP | 2002-247424 A | | 8/2002 |
| JP | 2003-154894 A | | 5/2003 |
| SE | WO2009/066988 | * | 5/2009 |
| WO | 2009/066988 A2 | | 5/2009 |

* cited by examiner

*Primary Examiner* — William C Vaughn, Jr.
*Assistant Examiner* — Daniel Tekle
(74) *Attorney, Agent, or Firm* — Volpe and Koenig, P.C.

(57) ABSTRACT

A method for setting up a monitoring camera includes tilting a camera head of the camera to a tilting position in which an optical axis of the camera substantially coincides with a rotational axis that the camera head is turning around when panning, and in which the camera head is able to capture images through a wide angle lens arranged in a fixed position in relation to a base of the camera. The camera head is turned around the optical axis of the camera and captures images until wide angle images captured through the wide angle lens present the desired orientation. A home position value for a pan motor of the camera is stored, wherein the position value represents the position value for the pan motor when the captured wide angle image presents the desired orientation.

5 Claims, 4 Drawing Sheets

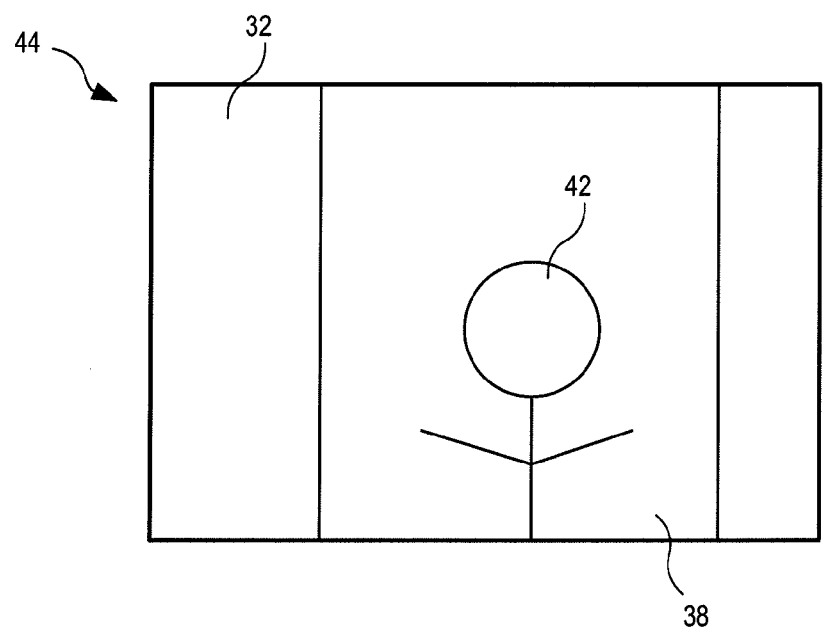
FIG 5
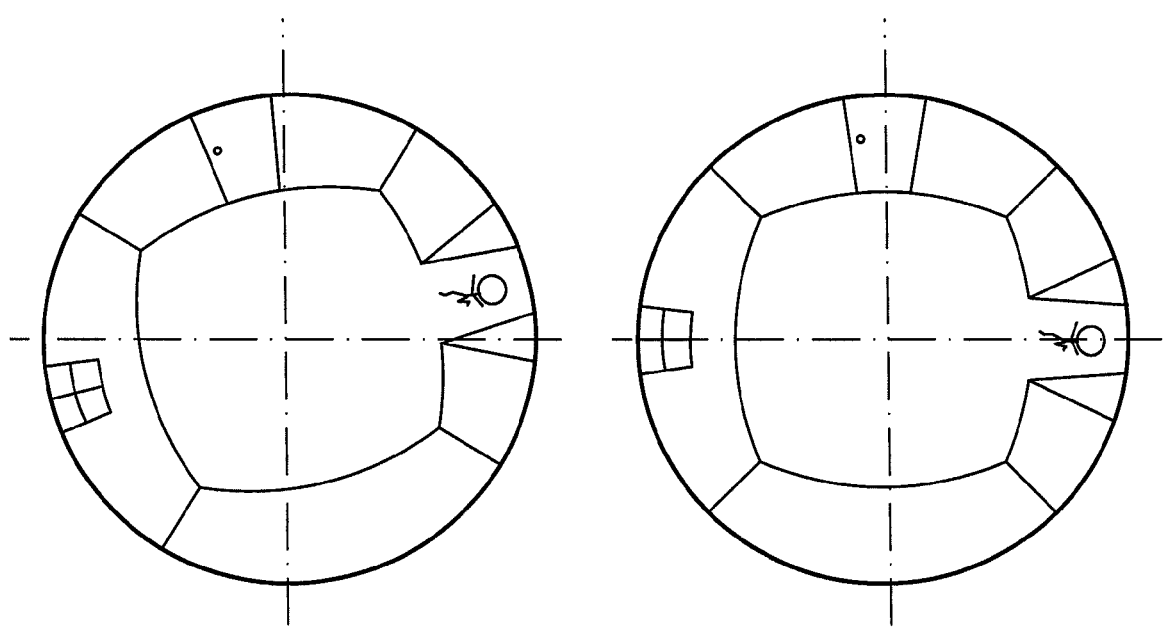
FIG 6a  FIG 6b

METHOD FOR SETTING UP A MONITORING CAMERA

TECHNICAL FIELD OF THE INVENTION

The present invention relates to monitoring cameras and monitoring systems. In particular the present invention relates to a method for setting up a camera for use in a monitoring system.

BACKGROUND OF THE INVENTION

Monitoring systems typically include monitoring cameras. There are a great variety of types of monitoring cameras having somewhat different features and is used for slightly different purposes or situations. One of these types of monitoring cameras is the wide angle monitoring camera. The wide angle monitoring camera is used in situations where a large area is to be monitored and where details in the view is less important. If details are important, an additional camera generally is added to the monitoring installation. Most monitoring cameras are fixedly mounted at a predefined position and most of the time the camera is required to provide images of a particular camera view. In most cases, this requirement is fulfilled by manually adjusting the camera until the captured image view corresponds to the required image view.

This type of camera adjustment is generally difficult to perform because of the inability to immediately see the result of a movement as most monitoring cameras do not have an incorporated preview display. The camera adjustment may also be difficult if no preview of the camera view is available or accessible at the location where the camera is mounted but only at a remote location.

This problem of making the camera view from a wide angle camera correspond to a requested camera view may initially seem insignificant because the wide angle camera is, in most cases, to be mounted in a direction straight down towards the ground or floor and then you get the requested camera view if you have selected the correct wide angle lens. However, even in a case where the wide angle camera directed towards the ground/floor captures the entire requested scene it may be advisable to align the camera view with obvious features in the scene or adjust the alignment of the camera view in any other way in order to achieve an image view that incur little or no strain when monitored by an operator. Today, in order to align such wide angle camera, the camera is turned around its vertical axis by the person mounting the camera while someone else is checking the captured image. Alternatively the person mounting the camera is able to see a display presenting the captured image from the position where he is mounting the camera or he will have to make small adjustments of the and then go to a display and checking the alignment.

One solution to this problem is to enable turning of the captured image for example in software running in the monitoring camera or in the display device. Then the camera simply is mounted and then the camera view is viewed in the display device where it is possible to instruct the turning software to turn the captured image. Then the image view may be aligned by very little effort during the installation of the monitoring camera. However, the turning of the captured images in a live video stream requires a lot of processing and may also slow the system down.

SUMMARY OF THE INVENTION

The present invention may facilitate installation of a monitoring camera, achieved by means of a method according to claim 1. Further embodiments are presented in the dependent claims.

More specifically, according to one embodiment of the invention, a method for setting up a monitoring camera comprises tilting a camera head of the camera to a tilting position in which an optical axis of the camera substantially coincides with a rotational axis that the camera head is turning around when panning and in which the camera head is able to capture images through a wide angle lens arranged in a fixed position in relation to a base of the camera. The camera head is turned around the optical axis of the camera and capturing images by means of the camera head until wide angle images captured through the wide angle lens present the desired orientation. A home position value is stored for a pan motor of the camera, wherein the position value represents the position value for the pan motor when the captured wide angle image presents the desired orientation. The advantage of the above setup method is that the installation or set up relating to the camera becomes easier alternatively that the operation of the camera requires less processing power. Hence, the method is potentially facilitating installation and allows the use of either less powerful processors or other more process intensive applications to run on the monitoring camera.

According to one embodiment, the camera head captures overview images of a monitored area when capturing images through the wide angle lens. This is advantageous in that the camera may perform both overview surveillance and detailed identification in the same device, without investing in a plurality of cameras.

In one embodiment the method further comprises presenting on a display the images captured through the wide angle lens as a live presentation of moving imagery in the form of a round wide angle overview. The roundness of the overview may likely originate from the distortion of the wide angle lens. However, if the lens used does not introduce as severe distortion, then the imagery may be distorted in a client computer used to display the imagery.

In yet another embodiment, the turning of the camera head is performed in response to an operator indicating turning of the overview image in an overview interface presented on the display, and wherein the round angle overview presentation is turning accordingly.

One embodiment further comprises receiving a signal indicating a request for entering wide angle view after a home position has been stored, and in response to receiving the signal indicating a request performing the steps of tilting the camera to a tilting position in which an optical axis of the camera substantially coincides with a rotational axis that the camera is turning around when panning, and turning the camera around the optical axis of the camera until the stored home position of the pan motor of the camera has been reached. The advantage of this way of entering the overview camera view is that the camera directly provides an operator friendly view, facilitating the task of an operator assigned to the task of monitoring the imagery from the monitoring camera.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an", "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which FIG. 5 is an example of a detailed view from the monitoring camera in example room of FIG. 3 capturing images through the dome glass as depicted in FIG. 2, FIG. 6a is an example overview image of the example room of FIG. 3 acquired by the monitoring camera not being set up properly, FIG. 6b is an example overview image of the example room of FIG. 3 acquired by the monitoring camera when the monitoring camera is set up properly and aligned.

Further, in the figures like reference characters designate like or corresponding parts throughout the several figures.

DETAILED DESCRIPTION OF EMBODIMENTS

The present invention relates to a monitoring camera and facilitating setting up such a camera.

Figure 1:
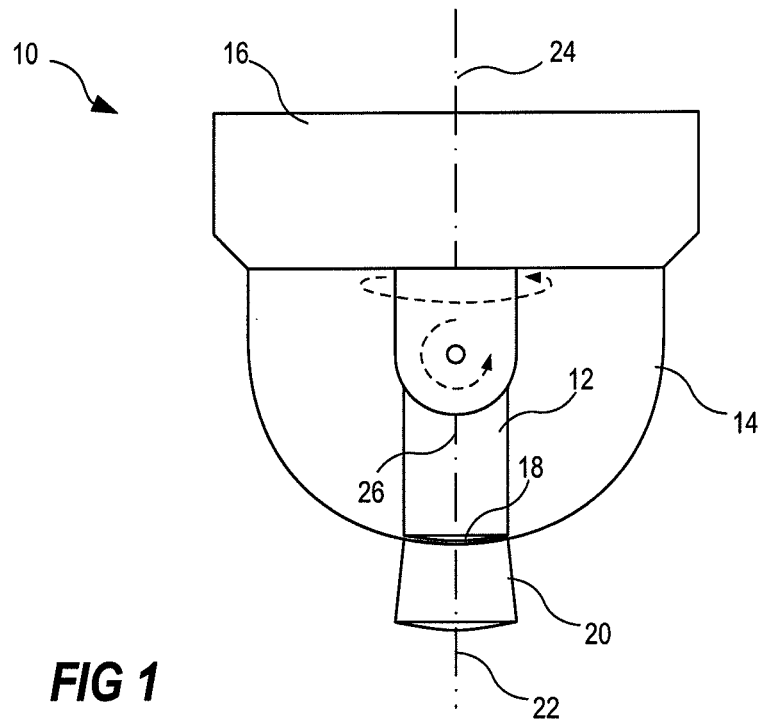
FIG. 1 is a schematic side view of a monitoring camera implementing one embodiment of the invention.

Referring to FIG. 1, according to one embodiment the monitoring camera 10 is a dome camera including a camera head 12, a transparent dome cover 14, and a dome base 16. The camera head 12 is enabled to pan and tilt by means of electronically controlled motors, not shown. The camera head 12 may be any known camera head that is enabled to pan and tilt. Further, the camera head 12 includes a lens 18. The lens 18 is arranged to focus light representing a scene to be captured by the camera 10 onto an image sensor in the camera head 12. The viewing angle of the captured image may be fixed or variable. Variable viewing angle may be accomplished by having a zoom enabled lens 18. In case of a fixed viewing angle lens the selection of the viewing angle may differ between different applications of the camera.

The dome camera further comprises a wide angle lens 20 mounted on the transparent dome cover 14 and extending from the dome cover 14 and away from the camera head 12. The wide angle lens 20 is mounted in a direction making the optical axis 22 of the wide angle lens substantially coincide with a rotational axis 24 around which the camera head 12 is turned during panning, hereinafter referred to as panning axis 24. The viewing angle of the wide angle lens 20 is wider than the viewing angle of the lens 18 in the camera head 12. In one embodiment, the viewing angle of the wide angle lens 20 is substantially wider than the viewing angle of the lens 18 of the camera head 12. The view angle of the wide angle lens may be more than 180 degrees. However, depending on the application, the viewing angle may be less or more. The angle should at least be selected to provide a reasonable overview image.

Accordingly, the wide angle lens 20 is mounted so that the optical axis 26 of the camera head 12 is aligned with the optical axis 22 of the wide angle lens 20 when the camera head 12 is directed for capturing an image through the wide angle lens 20.

Figure 2:
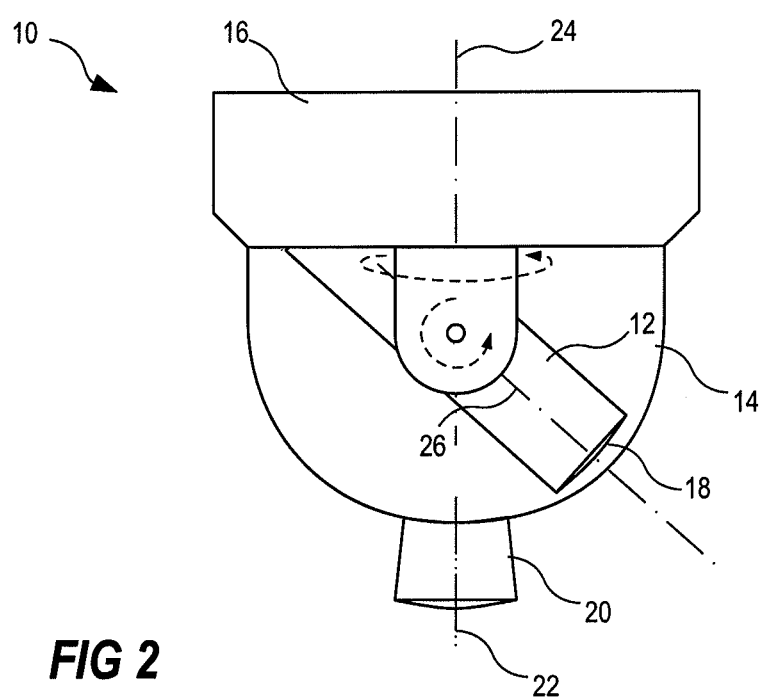
FIG. 2 is the same side view as in FIG. 1 with the difference that the camera head of the monitoring camera is tilted.

Due to the positioning of the wide angle lens 20 and the fact that the camera head 12 is moveable, it is possible to capture overview images through the wide angle lens 20 as depicted in FIG. 1. When something interesting is spotted or detected in the overview image, it is possible to investigate in more detail by simply moving the camera head 12 away from the wide angle lens 20 and directing it towards the interesting event or feature and capturing images through the dome cover. In FIG. 2, the camera is shown in a position for capturing the images through the dome cover in order to get a more detailed view and not through the wide angle lens 20.

In one embodiment, the viewing angle or the focal length of the lens 18 of the camera head 12 is selected so that the images captured by the camera head 12, when not captured through the wide angle lens 20, is adequate for providing relevant surveillance information. Examples of relevant surveillance information may for instance be the registration number of a car, an identifiable face of a person, detailed progress of an event, etc. The viewing angle of the wide angle lens 20 may be selected so that the camera head 12 will capture an image view of at least the floor of an entire room in which the monitoring camera is installed when directed to capture images through the wide angle lens 20.

Alternatively, the viewing angle of the wide angle lens 20 is selected so that the camera head 12 will capture an overview image of the monitored area when the camera head 12 is directed to capture images through the wide angle lens 20. Then an operator or an image analysis process may identify events or features of interest in the overview and redirect the camera head 12 for "direct capture" of the scene including the event or feature of interest, where "direct capture" relates to capturing an image by the camera head 12 when not directed to capture images through the wide angle lens 20.

Figure 3:
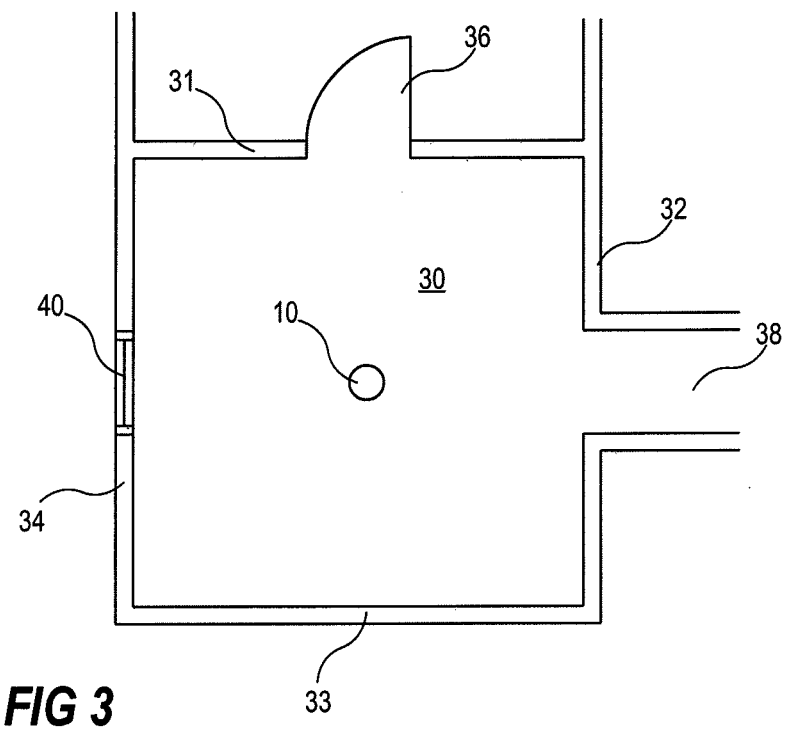
FIG. 3 is a schematic overview of an example room in which a monitoring camera according to one embodiment of the invention is fictionally installed.
Figure 4:
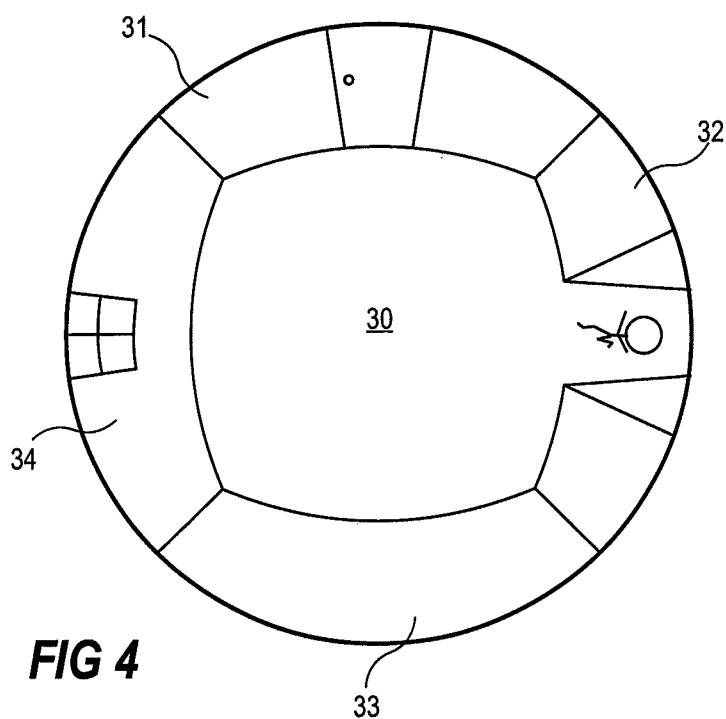
FIG. 4 is an example overview image from the monitoring camera in the example room of FIG. 3 capturing images through a wide angle lens as in FIG. 1.

In order to facilitate the understanding of the function of the camera, an example scenario is described as follows. A monitoring camera 10 according to one embodiment is installed in the ceiling of a room 30, see FIG. 3. The room includes four walls 31-34, wherein wall 31 hold a door 36 for passage to an area next to the room, wall 32 presents a passage into a corridor 38, and wall 34 holds a window 40. The monitoring camera 10 is assumed to be set in an overview mode, (i.e., the camera head is capturing an overview image of the monitored area, by capturing images through the wide angle lens), the setting of the camera that is shown in FIG. 1. A frame from a video sequence from the monitoring camera 10 in overview mode may look like the image in FIG. 4, in which all four walls 31-34 of the monitored room 30 are captured by the overview camera view, (i.e., the entire room 30 is captured by the monitoring camera when in overview mode). Moreover, the image frame reveals that a person 42 is entering the room. This is probably even more evident from a video sequence including the image frame. If an operator having access to the imagery of this monitoring camera 10, and having authority to control the monitoring camera 10, finds this person 42 interesting and would like to get a more detailed image of the person 42, then the operator may simply indicate the person 42 or the area of the person in the overview image at a control station and the camera head of the monitoring camera is directed away from the wide angle lens 20 and towards the indicated area of the monitored room 30. Hence, the camera head 12 will be moved into a position similar to the position showed in FIG. 2, and will possibly capture an image 44 as the one presented in FIG. 5. The image captured by the camera head 12 may have a wider or narrower image view depending on the lens 18 on the camera head 12 and/or the zoom setting of this lens 18. Then, when the operator has finished studying the person, the camera head 12 may be returned to capture images through the wide angle lens 20 and thereby be returned to the overview mode of the monitoring camera.

When installing cameras presenting an overview image, some problems may be encountered. For instance, the scene captured by the wide angle camera view may include features that are linear or are defining a repetitive linear pattern which should be oriented in a specific way in relation to the orientation of the image presented on a display. If these linear features are slightly off in the resulting image, then the observer of the image may be irritated or disturbed resulting in inferior performance of an operator of a monitoring system, if the image is a monitoring image in a monitoring system observed by the operator. Such linear features being slightly off may even have severe effects from an ergonomically point of view in that the operator unconsciously tilt or turn his head in order to align these features and that he is performing such actions for long time periods. Further features that may be troublesome to an observer when positioned slightly off are doorways, windows, etc. The above is true even if linear features of some wide angle lenses are displayed somewhat curved. In FIGS. 6a and 6b, this problem is illustrated. The camera view of FIG. 6a illustrates a slightly misaligned camera and the camera view of FIG. 6b illustrates an aligned camera. Another reason for aligning the overview image may be to turn the view of the monitored area in a way that is natural for the observer and thereby make it easier for the observer to orientate.

Figure 7:
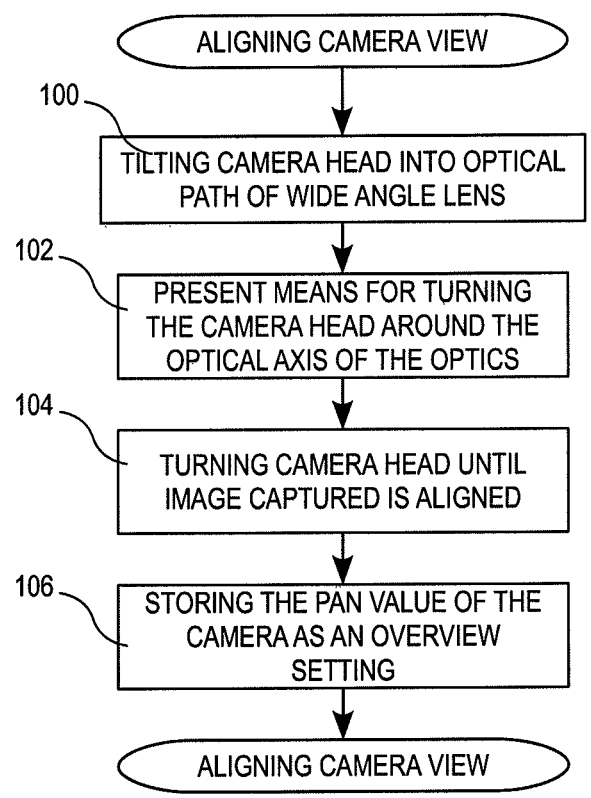
FIG. 7 is a flowchart over a process for aligning a monitoring camera during set up of the monitoring camera.

According to one embodiment of the invention setting up, i.e. making the monitoring camera 10 ready for operation for example by mounting the camera and adjusting its settings for operation, the monitoring camera includes aligning the image to be presented on the display of an observer by means of the process described below, see FIG. 7 and FIG. 1. This process may be part of an installation and configuration process initiated by a user.

Initially the camera head 12 is tilted towards the wide angle lens 20 mounted onto the dome 14, step 100, in order to capture a wide angle camera view through the wide angle lens 20, i.e. into the optical path 22 of the wide angle lens 20. The direction of the camera head 12 after the tilting may also be described as the camera head being tilted so that the optical axis 26 of the optics 18 of the camera head 12 substantially coincides with the optical axis 22 of the wide angle lens 20. Then, when the camera head 12 has been tilted, an operator of the monitoring camera 10 is presented, step 102, with the possibility to turn the camera head 12 around the optical axis 22 of the wide angle lens 20, which is coinciding with the optical axis 26 of the optics 18 of the camera head 12. If the alignment of the scene captured by the monitoring camera 10 is not satisfactory, then the operator may instruct the camera 10 to turn the camera head 12 around the optical axis 26 of the optics 18 of the camera head 12 and thus, the optical axis 22 of the wide angle lens 20, step 104. The turning of the camera may be instructed by the operator using the same means as used for panning or any other control means including physical controls such as joystick, keyboard, track pad, mouse, etc., or virtual controls implemented in a graphical user interface presented on the monitoring screen used by the operator. The operator may then halt the turning of the camera head 12 when the captured image is determined to be aligned. When the operator of the camera has determined that the camera head is sufficiently aligned, the position of the camera head 12 is stored as an overview home position, step 106. The overview home position includes a value indicating a pan position of the camera. A tilt position is not necessarily stored together with the pan position in the over view home position because the camera head 12 always is tilted into a position orthogonal to a rotational plane of panning when in overview position, i.e., into a position coinciding with the rotational axis 24 of the panning movement and the optical axis of the wide angle lens 20.

When the overview home position is set, the operator, who is panning and tilting the camera head 12 and directing the camera view in directions not including the optical path of the wide angle lens 20 in order to capture specific images of the environment, e.g. as illustrated in FIG. 2, is able to return the camera view to the overview using a control interface (e.g., by pushing a button or indicating a request for overview in any other known way using the control interface). The control interface may include physical control means such as buttons, keys, joysticks, wheels, etc., or it may include virtual control means presented on a display and controlled by touching the screen (e.g. a touch screen), or by guiding a pointer to the position on the screen select (e.g., a computer mouse or any other computer control device). In response to the request of the overview, the camera head 12 is tilted so that the optical path 26 of the optics 18 of the camera head 12 is projecting through the wide angle lens 20 (i.e., optical path 26 of the optics 18 of the camera head 12 is aligned with the optical path 22 of the wide angle lens 20, as illustrated in FIG. 1). Further, the stored pan position is retrieved and the camera head 12 is panned to the pan position indicated by the value of the stored pan position. The panning of the camera head 12 may be performed before, after, or substantially simultaneously with the tilt of the camera head 12. In case of the camera head 12 being tilted before it is panned, the panning of the camera view substantially results in the camera head 12 being turned around the optical axis 26 of the optics 18 of the camera head 12 and the optical axis 22 of the wide angle lens 20.

According to another embodiment, the camera includes an electronic compass and the overview image is turned in a direction defined as a compass direction, e.g., the overview image may always be turned so that the top image is representing the northern portion of the area monitored.

What is claimed is:

1. A method for setting up a monitoring camera, the method comprising:
   tilting a camera head of the camera to a tilting position in which an optical axis of the camera substantially coincides with a rotational axis that the camera head is turning around when panning, and in which the camera head is able to capture images through a non-moving wide angle lens physically unconnected to the camera head and fixedly mounted in a position in relation to a base of the camera;
   turning, after the tilting, the camera head around the optical axis of the camera and capturing images until wide angle images captured through the wide angle lens present the desired orientation; and
   storing a home position value for a pan motor of the camera, wherein the position value represents the position value for the pan motor when the captured wide angle image present the desired orientation, wherein the camera head is used for capturing wide angle images and detailed images.

2. The method according to claim 1, wherein the camera head when capturing images through the wide angle lens captures overview images of a monitored area.

3. The method according to claim 1, further comprising presenting on a display the images captured through the wide angle lens as a live presentation of moving imagery in the form of a round wide angle overview.

4. The method according to claim 3, wherein the turning of the camera head is performed in response to an operator indicating turning of the overview image in an overview interface presented on the display, and wherein the round angle overview presentation is turning accordingly.

5. The method according to claim 1, further comprising receiving a signal indicating a request for entering wide angle view after a home position has been stored, and in response to receiving the signal indicating a request performing the steps of:

tilting the camera to a tilting position in which an optical axis of the camera substantially coincides with a rotational axis that the camera is turning around when panning; and turning the camera around the optical axis of the camera until the stored home position of the pan motor of the camera has been reached.

\* \* \* \* \*